United States Patent

[11] 3,600,891

[72] Inventor Richard E. Gordon
  North Palm Beach, Fla.
[21] Appl. No. 886,239
[22] Filed Dec. 18, 1969
[45] Patented Aug. 24, 1971
[73] Assignee United Aircraft Corporation
  East Hartford, Conn.

[54] VARIABLE AREA NOZZLE
  11 Claims, 3 Drawing Figs.

[52] U.S. Cl. .................................................. 60/39.74
[51] Int. Cl. .................................................. F02c 3/24
[50] Field of Search ........................................ 60/39.74,
  39.65, 39.69; 431/89; 239/410, 570, 453; 261/78

[56] References Cited
  UNITED STATES PATENTS

| | | | |
|---|---|---|---|
| 2,332,535 | 10/1943 | Ross | 239/453 |
| 2,907,527 | 10/1959 | Cummings | 60/39.74 |
| 3,045,920 | 7/1962 | Hooker | 239/453 |
| 3,301,492 | 1/1967 | Kingsley | 239/453 |
| 3,510,112 | 5/1970 | Winquist | 261/37 |

Primary Examiner—Douglas Hart
Attorney—Jack N. McCarthy

ABSTRACT: A fuel supply system for turbine engines whereby a plurality of variable area fuel nozzles are placed around the circumference of a combustion section. Each nozzle is placed so as to direct fuel therefrom into an inlet passageway. Each inlet passageway generally forms a venturi section and has a fixed valve member positioned therein by a plurality of swirl vanes. Each nozzle has a short tubular member with one open end aligned with the fixed valve member. The adjacent ends of the tubular member and valve member being in contact when there is no flow in the tubular member. The other end of the tubular section is fixed to a radially extending tubular member which is fixed at its opposite end to fixed structure of the engine. The radially extending tubular member is formed to act as a cantilevered spring to provide for a valve action between the adjacent ends of the tubular member and valve member. The spring rate being predetermined so that the exit area of the nozzle will vary to provide for a desired opening size for a given force acting thereon by the fuel passing therethrough.

INVENTOR
RICHARD E. GORDON
BY Jack N. M. Cowley
AGENT

VARIABLE AREA NOZZLE

BACKGROUND OF THE INVENTION

This invention relates to variable area nozzles and more particularly to those in fuel supply systems of engines. In the prior art most fuel controls for turbine engines controlled fuel flow through a nozzle by using valving along the conduit supplying the fuel.

SUMMARY OF THE INVENTION

A primary object of the present invention is to provide a fuel nozzle having a cantilevered fuel feed tube with an outlet at an angle thereto which cooperates with a fixed valve member and to provide a nozzle having variable capacity with no sliding parts. In accordance with the present invention, a large turndown capability is provided for thereby eliminating a need for a pressurizing valve. This arrangement also provides self-cleaning through the variability of the space between the fixed valve member and the feed tube outlet as relative fuel flow increases to provide a contamination tolerance.

Any obstruction of the exit opening of a fuel nozzle will decrease the effective opening and increase the force acting on the nozzle and therefor bend the cantilevered fuel feed tube and enlarge the opening to its original area.

DESCRIPTION OF THE PREFERRED EMBODIMENT

Figure 1:
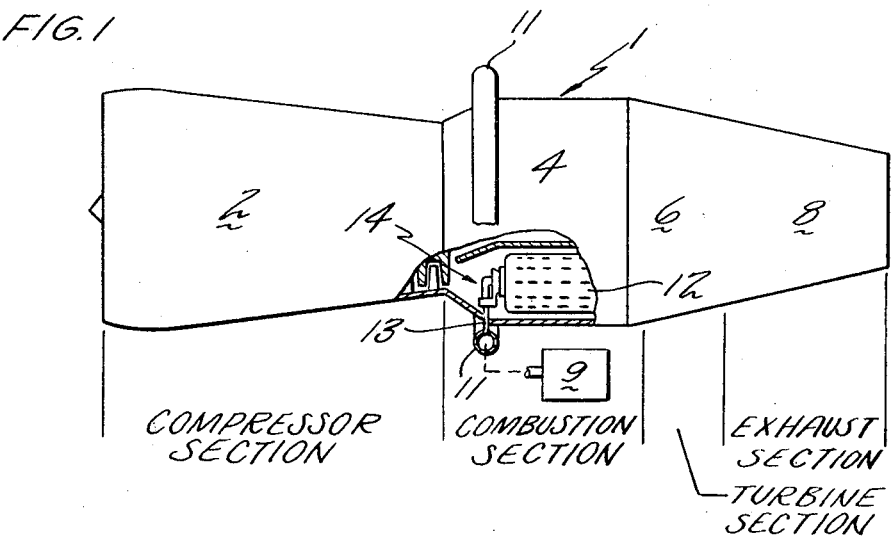
FIG. 1 is a view of a gas turbine engine showing the location of a burner in the combustion section and the fuel supply means.

Referring to Fig. 1 a gas turbine powerplant is shown indicated generally by 1. The powerplant has a compressor section 2, a combustion section 4, a turbine section 6, and an exhaust section 8. The combustion section 4 is comprised of a plurality of burner cans 12. However, an annular type burner could be used. A conventional fuel supply and metering control 9 provides the desired overall fuel flow to an annular manifold 11. A separate pipe 13 extends inwardly to each fuel-injection means 14.

Figure 2:
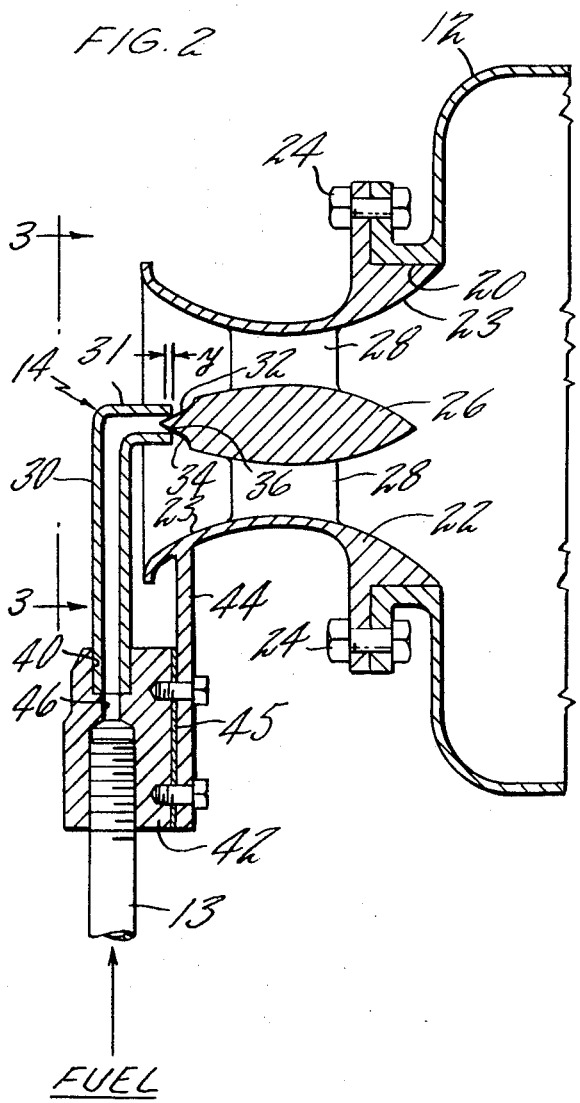
FIG. 2 is an enlarged view of the front of the burner including the fuel-injection means.

In FIG. 2 an opening 20 is shown in the front end of the burner 12 which receives an air inlet element 22, which can be fixed thereto in any way desired. The means shown is by the use of abutting flanges and bolts 24. The inlet element 22 has a passageway 23 extending therethrough with a fuel-injection means 14 positioned therein to inject fuel at the center of the passageway, said passageway being shown formed as a venturi section. The fuel-injection means 14 includes a fixed valve member 26 and a cooperating fuel supply tube 30.

The fixed valve member 26 is formed with the forward end thereof shaped having a contoured, substantially conical valve surface 32 with an annular portion 34 which is curved to direct fuel flow radially into the venturi section of the passageway 23. The rear portion of the valve member 26 is formed having a streamlined contour and being of such length so as to be connected to the inner ends of vanes 28 which extend radially inwardly from the center of the venturi section of the passageway 23 of air inlet element 22. This forms an annular passageway. These vanes 28 are placed at an angle to give a desired swirl to gases passing through passageway 23.

Figure 3:
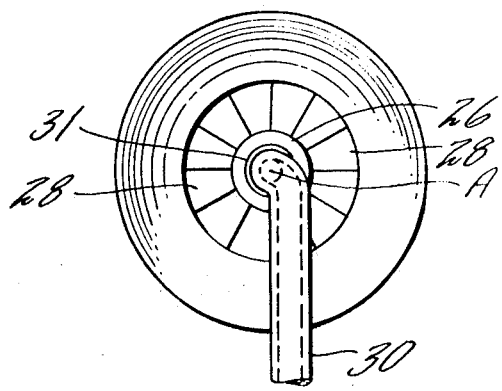
FIG. 3 is a view taken along the line 3–3 of FIG. 2.

While FIG. 2 is a showing of the burner can 12 of FIG. 1, as stated hereinbefore, burner 12 could be annular with a plurality of openings 20 spaced therearound to receive a plurality of air inlet elements 22. The burner cans or annular burner may be fixed into position by any conventional means. A plurality of fuel supply tubes 30 are spaced around the power plant, one for each valve member 26. Each fuel supply tube 30 is formed having a short end section 31 extending at an angle of approximately 90° therefrom. The open end of the short end section 31 is aligned with its cooperating valve member 26 and is positioned to contact the contoured valve surface 32 for zero flow. The longitudinal axis A of the short end section 31 is offset from the longitudinal axis of the radially extending portion of the fuel supply tube 30 so that preswirling of the fuel occurs (See FIG. 3). The other end of the fuel supply tube 30 is fixed with respect to the valve member 26 so that an annular opening 36 is formed between the opening in the end of the short end section 31 and the contoured valve surface 32. The annular opening 36 is made the proper size as desired to obtain a required fuel flow for a given set of engine operating parameters.

As shown in FIG. 2 the fixed end of each fuel supply tube 30 is fixedly positioned in an opening 40 of a holding member 42. Each holding member 42 is fixedly connected to a flange 44 projecting outwardly from its respective air inlet element 22. A spacing member 45 can be provided to precisely position the open end of the section 31 with the cooperating contoured valve surface 32. A cooperating pipe 13 threadedly engages each mating holding member 42. A passageway 46 in holding member 42 connects pipe 13 to its respective fuel supply tube 30. The holding member 42 can be made annular thereby interconnecting all of the air inlet elements 22.

When the fuel is flowing in supply tube 30 the opening 36 has its area proportional to fuel pressure and fuel velocity. The tube 30 can be constructed to move a given distance "y" for a given force on the free end of the tube by controlling the cross-sectional shape, length, diameter, wall thickness and material of the tube. In this arrangement the tube 30 is acting as a cantilevered spring and conforms to well-known beam formulas.

I claim:

1. An engine having in combination, air supply means, fuel supply means, a combustion section, said combustion section having burner means, said burner means having an inlet passageway for airflow from said air supply means, said passageway having a first valve member positioned therein, a second valve member positioned adjacent said first valve member to provide a valving action therebetween, both of said valve members being exposed to said airflow to reduce contamination buildup between said valve members, means for directing fuel from said fuel supply means to said first and second valve members, an arm extending inwardly into said combustion section, said second valve member being fixed to said inwardly extending arm, one of said valve members being biased towards a closed position with respect to the other valve member wherein a force acting thereon by the fuel directed thereto moves said one valve member to an open position, said first valve member being a projecting plug and said second valve member being a tubular member which cooperates therewith, said fuel-directing means directing fuel first to said tubular member, said plug being fixed in position by means projecting from the inlet passageway.

2. An engine having in combination, air supply means, fuel supply means, a combustion section, said combustion section having burner means, said burner means having an inlet passageway for airflow from said air supply means, said passageway having a first valve member positioned therein, a second valve member positioned adjacent said first valve member to provide a valving action therebetween, both of said valve members being exposed to said airflow to reduce contamination buildup between said valve members, means for directing fuel from said fuel supply means to said first and second valve members, an arm extending inwardly into said combustion section, said second valve member being fixed to said inwardly extending arm, one of said valve members being biased towards a closed position with respect to the other valve member wherein a force acting thereon by the fuel directed thereto moves said one valve member to an open position, said inwardly extending arm extends radially and is formed to act as a cantilevered spring.

3. A combination as set forth in claim 2 wherein said inwardly extending arm is tubular in cross section and forms part of the means for directing fuel, said fuel being directed to said second valve member.

4. A combination as set forth in claim 1 wherein said inwardly extending arm is tubular in cross section and forms part of the fuel-directing means.

5. A combination as set forth in claim 4 wherein said inwardly extending arm is formed to act as a cantilevered spring.

6. An engine having in combination, air supply means, fuel supply means, a combustion section, said combustion section having burner means, said burner means having an inlet passageway for airflow from said air supply means, said passageway having a first valve member positioned therein, a second valve member positioned adjacent said first valve member to provide a valving action therebetween, means for directing fuel from said fuel supply means to said first and second valve members, an arm extending inwardly into said combustion section, said second valve member being fixed to said inwardly extending arm, said arm being formed to act as a cantilevered spring to permit said second valve member to move as a result of force exerted thereon by the fuel directed thereto.

7. A combination as set forth in claim 6 wherein said first valve member is a projecting plug fixed in position by means projecting from the inlet passageway, said second valve member being tubular and aligned to cooperate with said projecting plug, said arm being tubular in cross section, said tubular second valve member being connected to said tubular arm to permit flow therethrough, said tubular second valve member and tubular arm forming part of the fuel-directing means.

8. A combination as set forth in claim 6 wherein said arm extends radially inwardly from means fixed to said burner means.

9. A combination as set forth in claim 1 wherein the plug projects forwardly.

10. A combination as set forth in claim 7 wherein said plug projects forwardly.

11. A combination as set forth in claim 6 wherein said means for directing fuel includes a passageway in said second valve member and said inwardly extending arm.